United States Patent
Doitch et al.

(10) Patent No.: US 10,749,854 B2
(45) Date of Patent: Aug. 18, 2020

(54) SINGLE SIGN-ON IDENTITY MANAGEMENT BETWEEN LOCAL AND REMOTE SYSTEMS

(71) Applicant: Microsoft Technology Licensing, LLC, Redmond, WA (US)

(72) Inventors: Edan Doitch, Tel Aviv (IL); Yavor V. Angelov, Redmond, WA (US); Shiung-Vei Yong, Issaquah, WA (US); Yordan Ivanov Rouskov, Seattle, WA (US); Ross Peter Adams, Redmond, WA (US); Arieh Bibliowicz, Binyamina (IL); Hagar Romach, Hod Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/939,811

(22) Filed: Nov. 12, 2015

(65) Prior Publication Data

US 2017/0142094 A1    May 18, 2017

(51) Int. Cl.
*H04L 29/06*    (2006.01)
*G06F 21/41*    (2013.01)
(Continued)

(52) U.S. Cl.
CPC .......... *H04L 63/0815* (2013.01); *G06F 21/41* (2013.01); *G06F 21/6218* (2013.01);
(Continued)

(58) Field of Classification Search
CPC ............. H04L 63/0815; H04L 63/0807; H04L 63/102; H04L 63/0884; H04L 9/3213; H04W 12/06; G06F 21/6218
See application file for complete search history.

(56) References Cited

U.S. PATENT DOCUMENTS 6,754,696 B1 *   6/2004  Kamath ................. G06F 16/10
                                                    709/213
7,000,006 B1     2/2006  Chen
(Continued)

FOREIGN PATENT DOCUMENTS

CN    101507233 A    8/2009
CN    102281286 A    12/2011
(Continued)

OTHER PUBLICATIONS

Suzic, Bojan. "Securing integration of cloud services in cross-domain distributed environments." Proceedings of the 31st Annual ACM Symposium on Applied Computing. (2016): pp. 398-405.. (Year: 2016).*

(Continued)

*Primary Examiner* — Kari L Schmidt

(57) ABSTRACT

Single sign-on identity management between local and cloud-based systems is provided. A remote or cloud-based authentication endpoint is registered as a local device, service or resource in a user's local directory services system. A local device and associated user requesting access to cloud-based resources will then see the authentication endpoint as an internal (inside the enterprise) server and may supply an authentication ticket which includes on-premises log-in or sign-on identity for the user. The remote or cloud-based authentication endpoint may then validate the authentication ticket, and the user may then access devices, applications and services operated in association with the remote or cloud-based authentication endpoint without a second or separate log-in or sign-on and without use of additional authentication equipment at the user's enterprise network.

20 Claims, 8 Drawing Sheets

US 10,749,854 B2
Page 2

(51) Int. Cl.
*H04L 9/32* (2006.01)
*G06F 21/62* (2013.01)
*H04W 12/06* (2009.01)

(52) U.S. Cl.
CPC ........ *H04L 9/3213* (2013.01); *H04L 63/0807* (2013.01); *H04L 63/0884* (2013.01); *H04L 63/102* (2013.01); *H04W 12/06* (2013.01)

(56) References Cited

U.S. PATENT DOCUMENTS

| | | | |
|---|---|---|---|
| 7,711,835 B2* | 5/2010 | Braddy | G06F 21/10 709/229 |
| 8,370,905 B2 | 2/2013 | Sangubhatla | |
| 8,819,801 B2 | 8/2014 | Sangubhatla et al. | |
| 8,825,855 B2 | 9/2014 | Feng et al. | |
| 8,826,451 B2 | 9/2014 | Blubaugh | |
| 8,850,546 B1 | 9/2014 | Field et al. | |
| 9,225,707 B1* | 12/2015 | de Sousa | G06F 21/629 |
| 9,450,944 B1* | 9/2016 | Sousley | H04L 67/02 |
| 2002/0146132 A1* | 10/2002 | Medvinsky | H04L 9/0822 380/279 |
| 2003/0120948 A1* | 6/2003 | Schmidt | H04L 63/0815 726/8 |
| 2004/0128542 A1 | 7/2004 | Blakley et al. | |
| 2005/0278547 A1 | 12/2005 | Hyndman et al. | |
| 2006/0236382 A1 | 10/2006 | Hinton et al. | |
| 2007/0083522 A1* | 4/2007 | Nord | G06F 16/10 |
| 2007/0083750 A1 | 4/2007 | Miura et al. | |
| 2007/0118890 A1 | 5/2007 | Song | |
| 2007/0184819 A1 | 8/2007 | Barriga-Caceres et al. | |
| 2008/0059804 A1 | 3/2008 | Shah et al. | |
| 2009/0178132 A1 | 7/2009 | Hudis et al. | |
| 2009/0198835 A1 | 8/2009 | Madhusudanan et al. | |
| 2009/0228950 A1* | 9/2009 | Reed | H04L 63/0807 726/1 |
| 2009/0228967 A1* | 9/2009 | Gbadegesin | H04L 63/0807 726/8 |
| 2010/0229224 A1 | 9/2010 | Etchegoyen | |
| 2011/0231919 A1 | 9/2011 | Vangpat et al. | |
| 2011/0277026 A1 | 11/2011 | Agarwal et al. | |
| 2011/0277027 A1 | 11/2011 | Hayton et al. | |
| 2011/0307947 A1 | 12/2011 | Kariv et al. | |
| 2012/0011578 A1 | 1/2012 | Hinton et al. | |
| 2012/0096271 A1* | 4/2012 | Ramarathinam | H04L 63/0807 713/172 |
| 2012/0124652 A1 | 5/2012 | Choi et al. | |
| 2012/0179909 A1 | 7/2012 | Sagi et al. | |
| 2012/0254957 A1 | 10/2012 | Fork et al. | |
| 2013/0007845 A1 | 1/2013 | Chang et al. | |
| 2013/0227140 A1 | 8/2013 | Hinton et al. | |
| 2013/0254847 A1* | 9/2013 | Adams | G06F 21/6218 726/4 |
| 2014/0013409 A1* | 1/2014 | Halageri | H04L 63/0815 726/8 |
| 2014/0075565 A1 | 3/2014 | Srinivasan et al. | |
| 2014/0101310 A1* | 4/2014 | Savage | H04L 43/00 709/224 |
| 2014/0373126 A1 | 12/2014 | Hussain et al. | |
| 2015/0188922 A1 | 7/2015 | Parmar et al. | |
| 2016/0014077 A1* | 1/2016 | Plotnik | G06F 21/554 726/11 |
| 2016/0142408 A1* | 5/2016 | Raepple | H04L 9/3213 726/9 |
| 2016/0277497 A1* | 9/2016 | Bannister | H04L 67/1097 |
| 2016/0323280 A1* | 11/2016 | Sade | H04L 63/10 |
| 2016/0359854 A1* | 12/2016 | Bhargava | H04L 63/0884 |
| 2017/0012953 A1* | 1/2017 | Ylonen | H04L 63/08 |
| 2017/0111336 A1* | 4/2017 | Davis | H04L 63/08 |
| 2017/0213174 A1* | 7/2017 | Deshpande | G06Q 10/06315 |
| 2018/0054444 A9* | 2/2018 | Dotan | H04L 63/102 |
| 2018/0357294 A1* | 12/2018 | Zhang | H04L 63/102 |
| 2019/0123904 A1* | 4/2019 | Ackerman | H04L 63/0236 |

FOREIGN PATENT DOCUMENTS

| | | |
|---|---|---|
| CN | 102970292 A | 3/2013 |
| CN | 103930897 A | 7/2014 |
| CN | 104205723 A | 12/2014 |
| CN | 104410604 A | 3/2015 |
| CN | 104468587 A | 3/2015 |
| CN | 105052105 A | 11/2015 |
| GB | 2401509 A | 11/2004 |
| JP | 2005519501 A | 6/2005 |
| JP | 2006515447 A | 5/2006 |
| JP | 2008538247 A | 10/2008 |
| JP | 2011511363 A | 4/2011 |
| JP | 4892093 B1 | 3/2012 |
| KR | 1020110026408 A | 3/2011 |
| WO | 2006103176 A1 | 10/2006 |
| WO | 2009097073 A2 | 8/2009 |
| WO | 2013/071087 A1 | 5/2013 |
| WO | 2015116609 A1 | 8/2015 |

OTHER PUBLICATIONS

Chadwick, David, Alexander Otenko, and Edward Ball. "Role-based access control with X. 509 attribute certificates." IEEE Internet Computing 7.2 (2003): pp. 62-69. (Year: 2003).*
Felix, Pedro, and Carlos Ribeiro. "A scalable and flexible web services authentication model." Proceedings of the 2007 ACM workshop on Secure web services. (2007): pp. 66-72. (Year: 2007).*
Stihler, Maicon, et al. "Integral federated identity management for cloud computing." 2012 5th International Conference on New Technologies, Mobility and Security (NTMS). IEEE, (2012): pp. 1-5. (Year: 2012).*
"Windows Azure Active Directory: Access Control to Windows Azure", Retrieved from <<https://www.youtube.com/watch?v=DiWVVH3Shvg8>>, Feb. 27, 2013, 1 Page.
"International Search Report and Written Opinion Issued in PCT Application No. PCT/US2016/060746", dated Jan. 24, 2017, 13 Pages.
Planky, "Single-Sign-On between On-Premise Apps, Windows Azure Apps and Office 365 Services", Published on: Nov. 27, 2010 Available at: http://blogs.msdn.com/b/plankytronixx/archive/2010/11/27/single-sign-on-between-on-premise-apps-windows-azure-apps-and-office-365-services.aspx%20title=.
Chappell, David, "Providing Single Sign-On to Amazon Ec2 Applications from an On-Premises Windows Domain", In WhitePaper of David Chappell & Associates, Dec. 2009, pp. 1-12.
Betts, Samuel, "Setup SharePoint Online & On-Premises Single-Sign-on (SSO)", Published on: Sep. 9, 2014 Available at: http://blogs.msdn.com/b/sambetts/archive/2014/09/09/setup-sharepoint-online-amp-on-premises-single-sign-on-sso.aspx.
Revar, et al., "Securing User Authentication using Single SignOn in Cloud Computing", In Proceedings of Nirma University International Conference on Engineering, Dec. 8, 2011, pp. 1-4.
Bimbra, et al., "Test drive SSO", Published on: Apr. 22, 2012 Available at: http://www.ibm.com/developerworks/ibmi/library/i-sso-pdf.pdf.
"International Preliminary Report on Patentability Issued in PCT Application No. PCT/US2016/060746", dated Aug. 7, 2017, 8 pages.
"CSC Introduces Cloud IAM Identity and Access Management Solution", Retrieved From: http://www.csc.com/newsroom/press_releases/62850-csc_introduces_cloudiam_identity_and_access_management_solution, Retrieved on: Jan. 12, 2012, 3 Pages.
"How Can I Obtain Identity and Access Management as a Cloud Service?", Retrieved From: https://web.archive.org/web/20120112044029/http://www.ca.com/~media/Files/SolutionBriefs/CS1837-cloudMinder-solution-brief.pdf, Retrieved on: Jan. 12, 2012, 10 Pages.
"VMware—Cloud Director Administrator's Guide", Retrieved From: https://web.archive.org/web/20100928052149/vmware.com/pdf/vcd_10_admin_guide.pdf, Sep. 28, 2010, 104 Pages.
"Final Office Action Issued in U.S. Appl. No. 13/425,143", dated Feb. 4, 2014, 29 Pages.

(56) References Cited

OTHER PUBLICATIONS

"Final Office Action Issued in U.S. Appl. No. 13/425,143", dated May 28, 2015, 33 Pages.
"Final Office Action Issued in U.S. Appl. No. 13/425,143", dated Jan. 19, 2017, 35 Pages.
"Non Final Office Action Issued in U.S. Appl. No. 13/425,143", dated Sep. 12, 2016, 28 Pages.
"Non Final Office Action Issued in U.S. Appl. No. 13/425,143", dated Aug. 21, 2017, 33 Pages.
"Non Final Office Action Issued in U.S. Appl. No. 13/425,143", dated May 18, 2018, 6 Pages.
"Non Final Office Action Issued in U.S. Appl. No. 13/425,143", dated Apr. 26, 2013, 20 Pages.
"Non Final Office Action Issued in U.S. Appl. No. 13/425,143", dated Dec. 18, 2014, 28 Pages.
"Notice of Allowance Issued in European Patent Application No. 13765123.8", dated Jan. 25, 2018, 1 Page.
"Notice of Allowance Issued in European Patent Application No. 13765123.8", dated Sep. 18, 2017, 7 Pages.
"Office Action Issued in European Patent Application No. 13765123.8", dated Oct. 6, 2016, 4 Pages.
"Search Report Issued in European Patent Application No. 13765123.8", dated Nov. 11, 2015, 7 Pages.
"First Office Action and Search Report Issued in Chinese Patent Application No. 201380015627.8", dated Oct. 18, 2016, 13 Pages.
"Notice of Allowance Issued in Chinese Patent Application No. 201380015627.8", dated Jun. 1, 2017, 5 Pages.
"Notice of Allowance Issued in Japanese Patent Application No. 2015-501686", dated Mar. 31, 2017, 4 Pages.
"Office Action Issued in Japanese Patent Application No. 2015-501686", dated Jan. 25, 2017, 6 Pages.
"Domain 12: Guidance for Identity & Access Management V2.1", Retrieved From: https://web.archive.org/web/20100705082245/https://cloudsecurityalliance.org/guidance/csaguide-dom12-v2.10.pdf, Apr. 2010, 39 Pages.
Funabashi, Mikio, "Building a hybrid cloud", Published in Fujitsu by Fujitsu Ltd., vol. 62, Issue 1, Jan. 27, 2011, 9 Pages.
"Give your Business an edge with Microsoft's On-premises and Cloud Services", Retrieved from: http://www.thewindowsclub.com/give-your-business-an-edge-with-microsofts-bunch-of-on-premises-cloud-services, Mar. 4, 2011, 4 Pages.
Huang, et al., "Identity Federation Broker for Service Cloud", In Proceedings of the International Conference on Service Sciences, May 13, 2010, pp. 115-120.
Liu, et al., "Communications Enablement of Software-as-a-Service (SaaS) Applications", In Proceedings of the 28th IEEE Conference on Global Telecommunications, Nov. 30, 2009, 8 Pages.
"International Search Report & Written Opinion Issued in PCT Application No. PCT/US2013/028121", dated Jun. 3, 2013, 9 Pages.
"Office Action Issued in Korean Patent Application No. 10-2014-7026141", dated Jul. 3, 2019, 11 Pages.
"Office Action and Search Report Issued in Chinese Patent Application No. 201680066500.2", dated Apr. 26, 2020, 16 Pages.
Weixin, "Windows Azure Federated Authentication Service Configuration", Retrieved From: https://blog.csdn.net/weixin_34240520/article/details/92322610, Jan. 12, 2015, 139 Pages.

\* cited by examiner

SINGLE SIGN-ON IDENTITY MANAGEMENT BETWEEN LOCAL AND REMOTE SYSTEMS

BACKGROUND

In a networked directory services system, various components are used for authenticating users and for generating authorization data for controlling access to network resources to provide secure network access to network data by authorized users and that rejects access by unauthorized users. In a typical corporate or other enterprise network, computing devices, applications and services are maintained and secured inside the enterprise network, and access to those systems is typically provided only to authorized enterprise personnel. However, as remotely situated computing devices, applications and services accessible to a user via a distributed computing network such as the Internet (also known as a cloud-based system) are becoming more and more available, there is a growing need for providing access to applications and services operated and maintained outside the user's enterprise network. In order to grant access to such remotely maintained applications and services, there is similarly a growing need for using existing on-premises device and/or user identities for access to remotely-based applications and services so that user access to such devices, applications and services is not difficult, time-consuming or cumbersome.

In a typical identity management system, a user may be required to log-in or sign-on to her local enterprise directory services system for accessing enterprise devices, applications and services, followed by a second log-in or sign-on to a cloud-based directory services system for accessing remotely-based devices, applications or services. Alternatively, an operator of the user's enterprise-based directory services system may install and maintain additional local translation devices/servers (e.g., federation servers) that translate a user's log-in or sign-on identity (e.g., credentials such as user name and password) into a token that can be consumed by the remote or cloud-based directory services system for authenticating the user's access to remote devices, applications and services. In the first instance, two sign-on operations must be conducted, and in the second instance, additional equipment must be maintained. Thus, there is a need for single sign-on (SSO) identity management that allows a user to access remote or cloud-based devices, applications and services that saves time, processing resources, equipment resources and that makes the sign-on process more efficient and enjoyable for the user.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present disclosure provide single sign-on identity management between local and cloud-based systems. According to aspects, a remote or cloud-based authentication endpoint is registered as a local address in a user's local directory services system so that a client application in a local directory environment can perform authentication against the endpoint without user interaction. According to an example implementation, the endpoint may be registered as an intranet address in the user's local directory. Because the authentication endpoint is registered to the local directory services system to be seen as an internal device, service or resource, the local device, application or service requesting access to cloud-based resources will then see the authentication endpoint as an internal (inside the enterprise) client and may supply an authentication ticket which includes on-premises log-in or sign-on identity for the user. The remote or cloud-based authentication endpoint may then validate the authentication ticket, and the user may then access devices, applications and services operated in association with the remote or cloud-based authentication endpoint without a second or separate log-in or sign-on and without use of additional authentication equipment at the user's enterprise network.

Examples are implemented as a computer process, a computing system, or as an article of manufacture such as a computer program product or computer readable media. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects.

DETAILED DESCRIPTION

Figure 1:
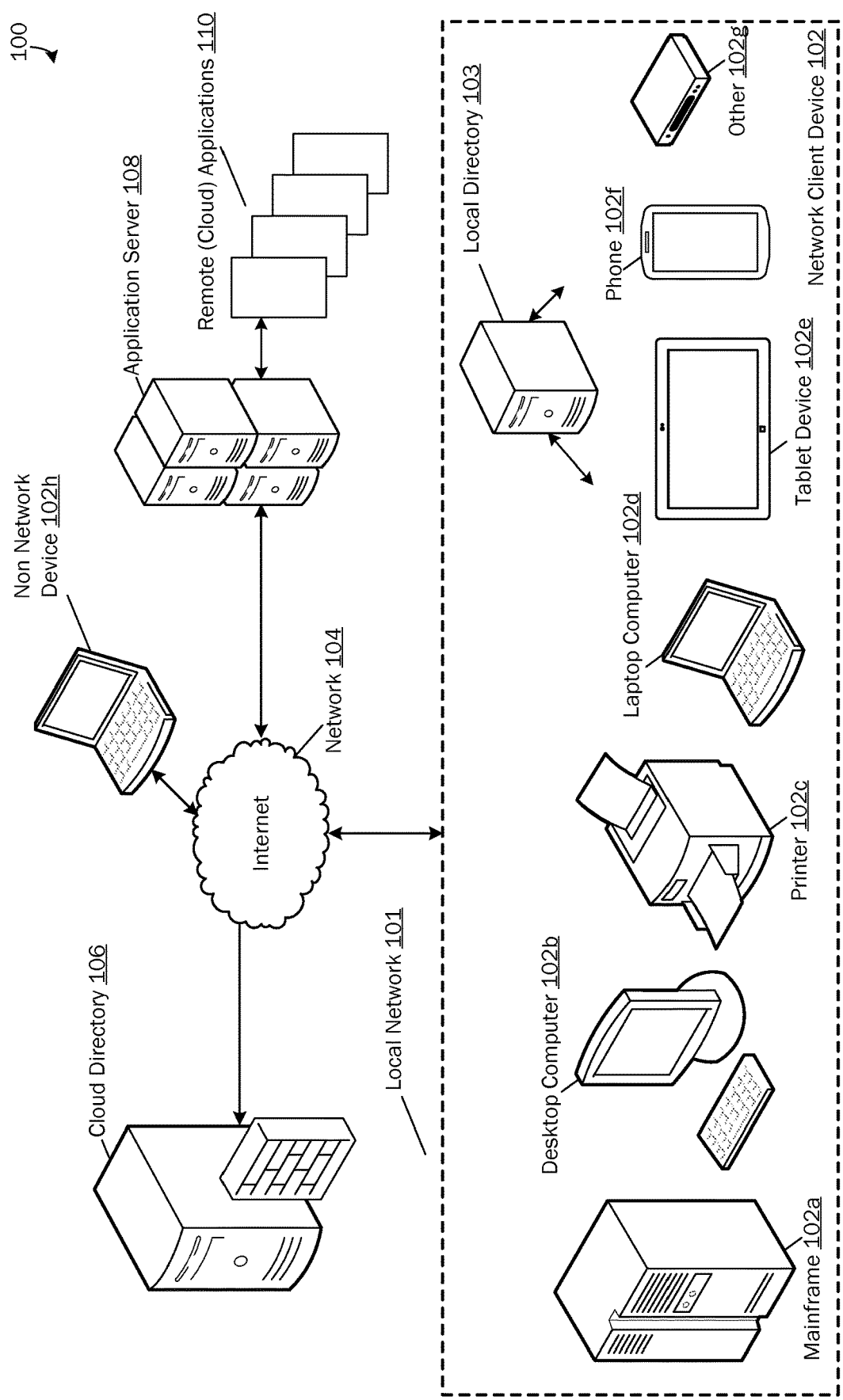
FIG. 1 is a simplified block diagram of a system for utilizing remote or cloud-based computing resources from a local computing device or system.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure provide single sign-on identity management between two or more computing systems, for example, between two or more local systems operated remotely from each other or between local and remote or cloud-based systems. According to aspects, a remote or cloud-based authentication endpoint is registered with a client side device, application or service either on a client device/service or at a local directory services system. According to one aspect, the authentication endpoint is registered (as described below) for allowing the client device/service to perform authentication against the endpoint when a local device/service (or user thereof) attempts to use a device/application/service for which authentication via the endpoint is required. According to one example operation, when the local authentication-requesting application is an Internet browsing application, the authentication endpoint may be registered as an intranet security principle on the local client device/application/service or in a user's local directory services system. In the case of registration in a requesting user's local directory services system, registration may be performed in the local directory services system in order to mark the authentication endpoint as a local device, service or resource (e.g., intranet address) in a collection of settings for local network devices (e.g., in a group policy object (GPO) for the local network device/application/service) in order to allow the remote authentication endpoint to be viewed by the local directory as a local device.

As described in further detail below, when registering the authentication endpoint with the local directory services system, a computer object for the authentication endpoint is added to the local directory services system for the authentication endpoint. According to aspects of the present disclosure, a unique identifier (e.g., a service principal name (SPN)) is created for the registering authentication endpoint for associating or linking the endpoint with the local directory services system and devices, applications and services associated with the local directory services system that may require authentication against the endpoint. When a request for access to a remote or cloud-based device, application or service is received, wherein the requesting client tries to authenticate against the remote endpoint for access to the requested device/application/service, the remote authentication endpoint asks for a service ticket from the local directory services system for a requesting device/application/service object having a unique identifier (e.g., SPN) associated with the remote or cloud-based authentication endpoint (i.e., the target of the request).

According to one example aspect, the added computer object is associated with the local directory services system using an offline domain join provision process wherein the domain joined client device, application or service sees the authentication endpoint as an internal (inside the enterprise) client and is able to supply an authentication ticket (e.g., a Kerberos ticket) which includes on-premises log-in or sign-on identity for the user. As should be appreciated, the registration process for the authentication endpoint may be performed by first adding a computer object (with an associated unique identifier (e.g., SPN)) to the local directory services system which represents the remote or cloud-based directory services system (and associated authentication endpoint), followed by configuring ("informing" or "telling") applications (e.g., a browser application) which will request access to remote or cloud-based resources to accept the endpoint address (e.g., a URL) as an appropriate address so that the requesting applications are allowed to request a service ticket from the local directory services system for a requesting user that may then be sent to the authentication endpoint without user interaction. Adding the computer object may be done globally once in the local directory services system to enable the requesting clients to ask the local directory services system to issue service tickets for a given computer object containing the requesting user's identity. The process that configures applications to accept the endpoint address as an appropriate address may be provisioned automatically, for example, via a collection of settings for local network devices/applications/services (e.g., in a group policy object (GPO) as described above) or this registration/configuration process may be performed manually for each device/application/service and associated user.

Upon request, the remote or cloud-based authentication endpoint may validate the authentication ticket using secret metadata (e.g., encrypted identification information such as a computer name or other computer identification and password, as well, as other encrypted identification information for a given device, application or service) that was created for the computer object in the object provisioning process for consuming the user's identity. That is, when a new computer object is added to the local directory services system for the remote or cloud-based directory services system and associated authentication endpoint, as described above, a password is created for the new computer object. The password (along with a computer name for the object and identification of the associated local directory services system domain) is used for validating the service ticket that will be issued for the computer object. According to one example implementation, while the password, computer name and domain identification may be used, a password only may suffice for the validation. Once the user is thus authenticated by the cloud-based authentication endpoint, the user may then access devices, applications and services operated in association with the remote or cloud-based authentication endpoint without a second or separate log-in or sign-on and without use of additional authentication equipment at the user's enterprise.

For example, a user may operate a computing device in a local on-premises enterprise environment such as a corporate network of her place of employment, a school network, a home network, or the like. A user's access to devices, applications and services of her local enterprise may be obtained by entry of user credentials (e.g., username, password, fingerprint scan, retina scan, voice recognition, or the like) at an on-premises device. At various points in the user's day, the user may desire use of cloud-based devices, applications or services or non-cloud-based devices, applications or services that are remote from the user's local network. For example, the user's employer may utilize a cloud-based productivity application suite (e.g., MICROSOFT OFFICE 365), and a user may from time-to-time wish to utilize one or more of the cloud-based applications for her work or leisure. Likewise, a user may wish to gain access to a remote or cloud-based database, data center or other remote or cloud-based data storage or data access point for storing, retrieving or otherwise utilizing data at various times. Other cloud-based devices, applications or services may also include a variety of communications services such as electronic mail and messaging services and the like. Non cloud-based devices, applications or services may reside at one or more local networks operated remotely from the user's local network.

According to aspects of the present disclosure, and as briefly described above, a remote or cloud-based authentication endpoint is registered with a user's local device, application or service either on a client device/application/service or at a local directory services system to allow the client to perform authentication against the endpoint. When the user then desires access to cloud-based resources from her on-premises computer or other device, an authentication ticket may be issued by her client device/application/service or her on-premises directory services system for use by the client for authentication access to the desired remote or cloud-based resource. According to this aspect, the client device/application/service or the on-premises directory services system is not aware that the issued ticket is for access to remote or cloud-based resources. The client or local directory services system assumes the ticket is being issued for a local device/application/service that is part of the local device/application/service domain or network. Thus, single-sign on is enabled, as described herein, because the client or local directory services system does not know it is enabling access to a remote or cloud-based resource.

FIG. 1 is a simplified block diagram of a system 100 for utilizing remote or cloud-based computing resources from a local computing device or system. As briefly described above, in a typical environment, users utilize the computing resources of a variety of devices and associated applications and services operated via a local enterprise, for example, their place of employment, place of education, place of leisure, and the like where one or more devices and associated applications and services may be networked together via a local network. In such a local network, individual user access to various devices, applications and services may be monitored and authorized internal to the local enterprise.

As illustrated in FIG. 1, a local network 101 is illustrated comprised of one or more client devices 102a-g (collectively, devices 102). As understood by those skilled in the art, the network devices 102 may form an on-premises intranet that may be operated at a single location or facility or that may be operated across one or more distributed locations or facilities for a given enterprise. According to aspects of the present disclosure, the one or more devices 102 may be allowed access to a variety of remote cloud-based applications and/or services 110 operated at one or more remote or cloud-based devices (e.g., an application server 108) via a distributed network 104, for example, the Internet. A non network device 102h is illustrative of a computing device situated remotely from the local network 101 that may communicate with systems of the local network 101 including accessing remote resources via the local network 101. As described in detail below with reference to FIGS. 2, 3, 4, 5, a local directory services system 103 maintains identity information for devices 102 and associated users and manages interaction between local devices 102 and other devices 102, as well as, interaction with a cloud-based directory services system 106 that may be utilized for authenticating access to and managing use of remote or cloud-based devices, applications 110 and services 108.

As briefly described above, when a user of a device 102 desires access to a device 102, application 110 or service 108 operated outside the user's local enterprise network 101, the user's access to remote or cloud-based resources must be authenticated, and according to aspects of the present disclosure, it is desirable that the user's access to remote or cloud-based resources be granted via a single sign-on by the user so that the user's access and use of remote or cloud-based resources is seamless to the user and so that the user's single sign-on to her on-premises computing device 102 serves as a sign-on to desired remote or cloud-based resources. For example, if the user desires use of a word processing application 110 maintained and operated at a cloud-based application server 108, it is desirable for the user to receive authenticated access to the requested word processing application 110 as part of the user's authenticated access to her local device 102.

Figure 2:
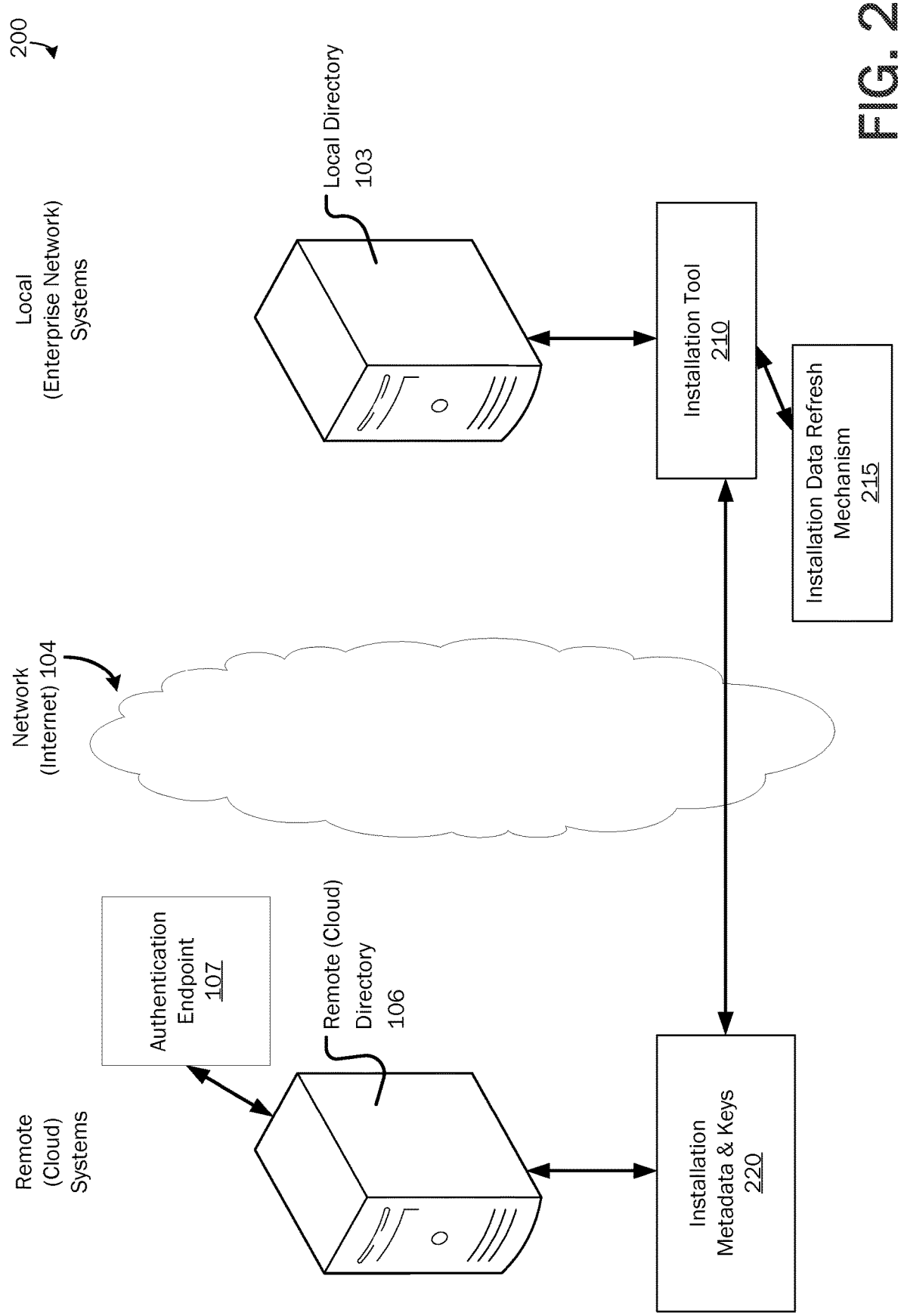
FIG. 2 is a simplified block diagram of a system for registering a remote authentication endpoint with a local directory services system.

FIG. 2 is a simplified block diagram of a system 200 for registering local computing resources with a remote or cloud-based directory services system. As briefly described above, according to aspects of the present disclosure, when an on-premises computing device 102 is installed in the local enterprise network 101 for use by one or more users in the on-premises enterprise, a computer object (with an associated unique identifier (e.g., SPN)) is added to the local directory services system which represents the remote or cloud-based directory services system (and associated authentication endpoint), followed by configuring ("informing" or "telling") applications (e.g., a browser application) which will request access to remote or cloud-based resources from the installed device to accept the endpoint address (e.g., a URL) as an appropriate address so that the requesting applications are allowed to request a service ticket from the local directory services system for a requesting user that may then be sent to the authentication endpoint without user interaction. As described below, this installation/registration process allows single sign-on access to resources for which authentication is required via the authentication endpoint without additional sign-on requirements or without additional authentication equipment, systems and resources at the local enterprise network 101. That is, according to this aspect, the on-premises device 102 may perform automatic authentication against the remote or cloud-based authentication endpoint owing to the local address associated with the endpoint.

Referring to FIG. 2, the installation tool 210 is illustrative of a software application, module, component or computer hardware component for registering a remote or cloud-based directory services system (and associated authentication endpoint) with the local directory services system 103 and for passing local device installation metadata and encrypted authentication data (keys) to the remote or cloud-based directory services system 106. According to an example aspect, the installation tool 210 serves to build a trust relationship between the local directory services system 103 and the remote or cloud-based directory services system 106 such that the authentication endpoint 107 is seen as another device/application/service in the local directory so that an authentication service ticket for a given local device 102 containing associated user identity information may be issued for allowing single sign-on access to a remote or cloud-based resource via the authentication endpoint.

The local directory services system 103 is illustrative of a service or system that maintains identity information for each device, application or service, or for users thereof in the local on-premises network 101 for assigning and enforcing security policy for all devices 102 including authenticated use of such devices 102 by one or more on-premises users, software installation and updates, and the like. For example, when a user logs into a given device 102 that is part of a device domain comprising the devices and systems 102 illustrated as part of the local network 101, the local directory services system 103 may be queried for determining whether a username and password or other authentication credential provided by the logging-in user is authentic for allowing a logging-in user to access the desired device, application or service in the local network 101. As should be appreciated, a domain in which the device 102 operates may span across a number of physical local networks 101 connected together via a distributed computing network 104. In one aspect, the local directory services system 103 maps the names of network resources and devices 102 to respective network addresses for allowing communication between network resources and devices 102. An example of a local directory 103 is ACTIVE DIRECTORY from MICROSOFT CORPORATION. In some aspects, the local directory services system 103 may include a domain controller that authenticates and authorizes users and computers within the local network 101 to communicate with each other as desired.

On the remote cloud-based side of the system illustrated in FIG. 2, the cloud-based directory services system 106 is illustrative of a cloud-based directory services system that may serve as a multi-tenant cloud-based directory and identity management service. According to aspects of the present disclosure, the cloud-based directory services system 106 may extend on-premises identities into the cloud to provide access to cloud-based devices, applications and services, as described herein. An example of cloud-based directory services system 106 is AZURE ACTIVE DIRECTORY from MICROSOFT CORPORATION.

The authentication endpoint 107 is illustrative of an authentication service that allows automatic authenticated connections between systems. According to aspects of the present disclosure, the endpoint 107 is operable to receive an authentication ticket issued by the local directory services system. The endpoint 107 then may validate the received ticket for allowing access to remote or cloud-based resources on behalf of a requesting client device/application 102, 410. An example of an authentication service includes WINDOWS INTEGRATED AUTHENTICATION (WIA) from MICROSOFT CORPORATION that uses the securities features of the Windows operating system for providing authenticated access to secure devices, applications and services. An example of an authentication ticket is a Kerberos ticket according to the Kerberos protocol.

The installation data 220, illustrated in FIG. 2, is illustrative of authentication data and identification data that may be passed from the local network 101 from the installation tool 210 to the cloud-based directory services system 106 for registering the remote authentication endpoint with the local directory services system. According to one example, the installation data 220 may include secret metadata (e.g., encrypted identification information such as a computer name and password, as well, as other encrypted identification information for a given device, application or service) that is created for the computer object added for the registered remote authentication endpoint in the object provisioning process for consuming the user's identity. As described above, when a new computer object is added to the local directory services system for the remote or cloud-based directory services system and associated authentication endpoint, a password is created for the new computer object. The password (along with a computer name for the object and identification of the associated local directory services system domain) is used for validating the service ticket that will be issued for the computer object. As should be appreciated, such data may be passed as encrypted and unencrypted metadata and/or keys.

The registration process may be used for marking the authentication endpoint as a local device, service or resource to the local directory services system 103 so that when the local directory services system 103 is asked to issue a service ticket for authenticating a local client device 102 with the remote authentication endpoint, the local directory services system 103 sees the authentication endpoint as another local device 102. As described above, if the requesting local authentication-requesting application is an Internet browsing application, the authentication endpoint may be registered as an intranet security principle on the local client device/application/service or in a user's local directory services system 103 for allowing single sign-on access to cloud-based resources, as described herein.

According to another example aspect, the registration process may be performed manually. As described above, a purpose of the registration process is to create a trust relationship between the local directory services system 103 and the remote or cloud-based directory services system 106. Thus, a computer object may be created with associated installation data (e.g., identification and authentication data), and administrative personnel may manually provide the installation data to the remote or cloud-based directory services system 106. For either an automated or manual registration process, the installation data may require renewal, refreshment or re-encryption from time-to-time to protect the installation data from unauthorized use.

Referring still to FIG. 2, an installation data refresh mechanism 215 is illustrative of a software module or device that updates the installation data from time-to-time, including re-encryption and collection of updated user credentials, and passes the updated data to the cloud-based directory services system 106 and to the local directory services system 103 via the installation tool 210. According to one example implementation, renewal or refreshment of installation data 220 may not be required, but may be performed periodically for security purposes or when underlying data changes. For example, renewal or refreshment of the installation data may include creating a new password via the local directory services system 103, followed by sending the new password securely to the remote or cloud-based directory services system 106 in order to extend or renew the trust relationship established between the remote or cloud-based directory services system 106 and the local directory services system 103 during registration of the remote system with the local system.

According to aspects, password renewal may also be performed as part of an alternative trust mechanism. For example, if the user utilizes the cloud-based directory services system 106 in a manner that allows extension of on-premises identities into the cloud to provide access to cloud-based devices, applications and services (e.g., the aforementioned AZURE ACTIVE DIRECTORY), where the system 106 enables password write-back which allows users to reset their passwords in the cloud-based directory services system 106 such that the reset password is propagated to the local directory services system 103, then such a password write-back feature may be used for resetting or renewing the password for the remote endpoint computer object.

Figure 3:
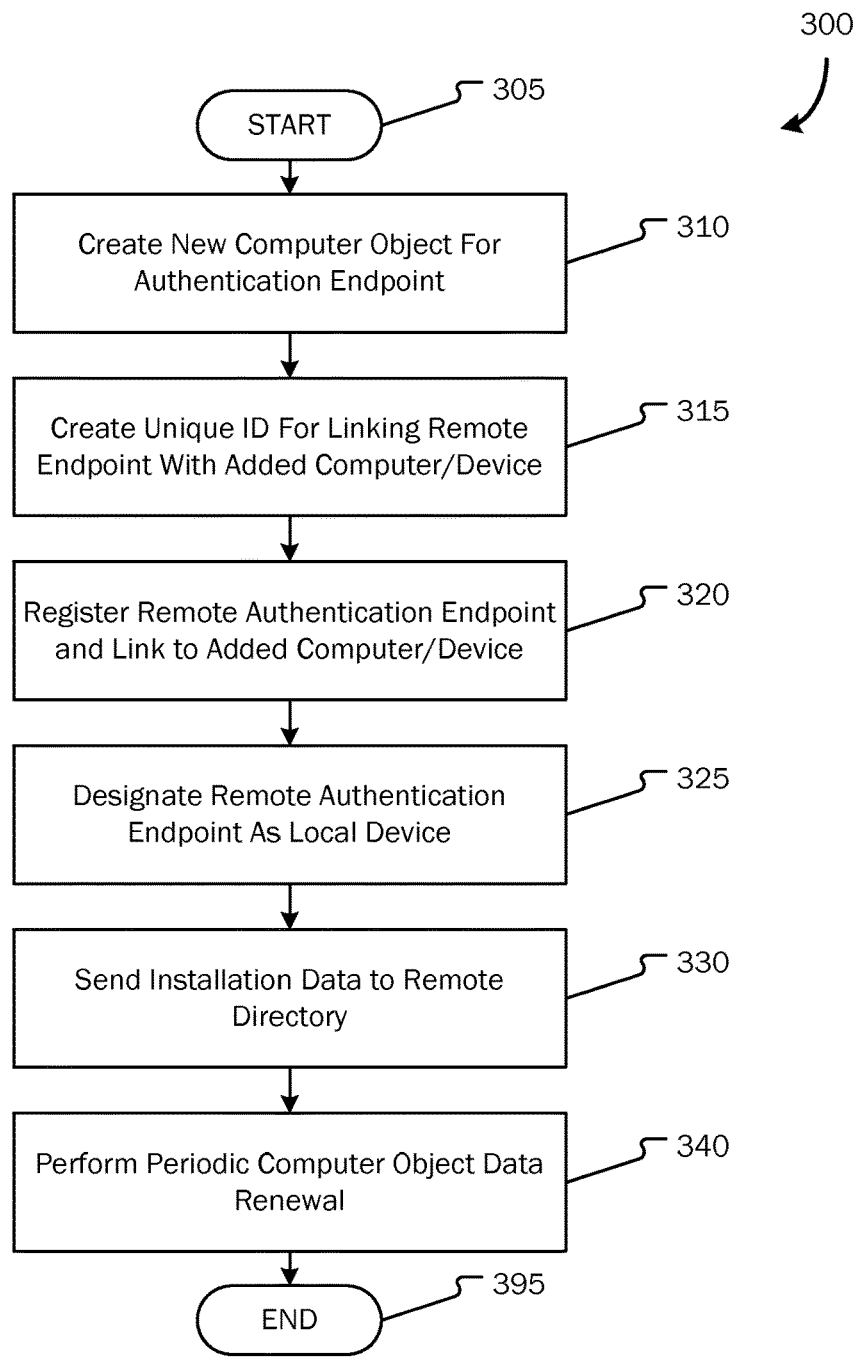
FIG. 3 is a flowchart showing general stages involved in an example method for registering a remote authentication endpoint with a local directory services system.

FIG. 3 is a flowchart showing general stages involved in an example method 300 for registering a remote or cloud-based authentication endpoint with a local directory services system so that the remote or cloud-based endpoint will appear as a local device to the local directory services system when a device, application, or service associated with the local directory services system requires access to remote or cloud-based resources where such access requires authentication via the remote or cloud-based authentication endpoint. As described herein, in order to allow single sign-on access to remote or cloud-based resources from a local network device 102, a remote or cloud-based authentication endpoint must be registered with the requesting local network device 102 or with the local network directory services system 103 in which the local device operates so that a trusted relationship is established between the local device or directory services system and the remote or cloud-based directory services system such that the remote or cloud-based authentication endpoint is seen by the local directory services system as another local device when the requesting local device requests access to remote or cloud-based resources via the remote or cloud-based authentication endpoint.

The method 300, illustrated in FIG. 3, illustrates an installation and registration process by which the remote cloud-based authentication endpoint is registered with a local directory services system with respect to a computer object added to the local network 101 that will be used for requesting access to remote or cloud-based resources as described herein. A new computer object is added to the network or domain for the remote authentication endpoint as one part of creating a trusted relationship between the remote or cloud-based authentication endpoint and the local directory services system 103 as described herein. According to one aspect, this process is not run every time a new object is created in the local directory services system, but happens once and is then renewed or extended in order to create trust between the remote and local directories.

Method 300 begins at start operation 305 and proceeds to operation 310, where a computer object for the remote authentication endpoint is added to the local directory services system 103 for allowing the remote endpoint to be linked to the local directory services system 103 as a local address so that local devices, applications and services can authenticate against the remote endpoint as a local address. According to one aspect of the present disclosure, the computer object is added to the local directory services system 103 to represent the remote or cloud-based directory services system 106 (and associated authentication endpoint). Adding the computer object may be done globally once in the local directory services system 103 to enable the requesting clients to ask the local directory services system 103 to issue service tickets for a given computer object containing the requesting user's identity.

As should be appreciated, the computer object added to the local directory services system 103 may include a variety of identification information for the added computer including a serial number for the added computer, a network address for the added computer, a type for the added computer (e.g., computer, peripheral device, etc.), as well as, credentials associated with a user of the added computer.

According to one aspect, the new computer object is added to the local directory services system 103 using an offline domain join provision process, but as should be appreciated, the computer object may be added to the local directory services system via any other suitable mechanism that will allow the local directory services system to issue authentication tickets to the remote or cloud-based authentication endpoint on behalf of the added computer object when a request for remote or cloud-based services is received from the added computer. According to an example implementation of the present disclosure, the offline domain join process is used in order to add a computer object that represents the remote or cloud-based directory and associated authentication endpoint, as described in detail above.

At operation 315, according to one example aspect, each object (e.g., device, application, or service) added to the local directory services system for which the authentication endpoint is registered may be assigned or may be associated with one or more unique identifiers (e.g., one or more service principal names (SPN)). Thus, when a request for access to a remote or cloud-based resource is received, wherein the requesting client tries to authenticate against the remote authentication endpoint for access to the requested resource, when the requesting client attempts to authenticate against the endpoint, the client asks for a service ticket from the local directory services system for the object having a unique identifier (e.g., SPN) associated with the remote or cloud-based authentication endpoint.

At operation 320, the remote or cloud-based authentication endpoint 107 is registered with the local directory services system 103 in association with the newly added computer object in order to create a link between the authentication endpoint and the newly added computer object via the local directory services system. The linkage or association between the remote or cloud-based authentication endpoint and the newly added computer object for the endpoint is performed by linking or associating the remote or cloud-based authentication endpoint with the newly added computer object via the unique identifier (e.g., SPN) created for the newly added computer object. According to aspects, linking the authentication endpoint to the computer identification object created for the authentication endpoint at the local directory services system is accomplished through the installation data 220 (e.g., password or other secret data items), as described below with reference to operation 330. According to one example implementation, registering the authentication endpoint includes configuring ("informing" or "telling") applications (e.g., a browser application) which will request access to remote or cloud-based resources to accept the endpoint address (e.g., a URL) as an appropriate address so that the requesting applications are allowed to request a service ticket from the local directory services system for a requesting user that may then be sent to the authentication endpoint without user interaction. This registration/configuration process may be provisioned automatically, for example, via a collection of settings for local network devices/applications/services (e.g., in a group policy object (GPO) as described above) or this registration/configuration process may be performed manually for each device/application/service and associated user.

At operation 325, as part of the registration of the remote or cloud-based authentication endpoint with the local directory services system, the remote or cloud-based authentication endpoint is marked or designated as a local device or endpoint (local to the local directory services system) such that when an authentication ticket is subsequently issued by the local directory services system for a requesting client for authentication against the registered remote or cloud-based authentication endpoint, the local or on premises directory services system will not be aware that the issued ticket is for use against a remote or cloud-based device (endpoint). That is, the local or on-premises directory services system will assume the ticket is being issued for a local device, application or service that is part of the local domain or network. According to one example aspect, the remote or cloud-based authentication endpoint is treated as a local device for allowing other local devices to authenticate against the endpoint for access to remote or cloud-based resources, as described herein. According to an alternative example aspect, the remote or cloud-based authentication endpoint may be marked, designated or treated as an intranet address at the local directory services system to allow Internet browsing applications to authenticate against the remote or cloud-based authentication endpoint as an intranet site.

According to an example aspect, the endpoint may be thus designated or marked as a local device, service or resource in a collection of settings at the local directory services system that define what the local network 101 will include in terms of devices, applications and services and how each of the devices, applications and services will behave relative to each other. By marking the cloud-based directory authentication endpoint 107 as a local device, service or resource in this collection of settings, the cloud-based directory services system will appear to the joined computer and other devices, applications and services in the local network 101 as another local device, application or service. An example of such a collection of settings is a group policy object (GPO) and such a collection of settings may be associated with organizational information containers maintained at the local directory services system 103, such as sites, domains, organizational units, and the like.

At operation 330, all relevant installation data 220 created during the installation process for the remote or cloud-based endpoint is passed to the cloud-based directory services system 106 and the associated authentication endpoint 107. According to one example aspect, the installation data 220 may be passed to and stored at a database that may be accessed by the cloud-based directory services system 106 and the associated authentication endpoint. The installation data 220 may include identification information for the joining computer object (for the authentication endpoint) as well as authentication information such as usernames, passwords, fingerprint scans, retina scans, voice recognition identification, and the like utilized for accessing the joining computer object and for installing the for associating the joining computer object with the cloud-based directory services system 106, as described herein. As should be appreciated, the metadata and other information passed for the joining computer object to the remote or cloud-based directory services system 106 may be sent via any suitable secure method, wherein information may be encrypted into one or more cryptographic keys, hash values, and the like for passing the information to the remote destination securely.

According to one example implementation, when the remote or cloud-based directory services system is initially created, an information technology (IT) administrative account is created. In order to have the remote or cloud-based directory services system accept the local directory installation data 220 (such that the remote directory will accept tokens issued by the local directory), linkage between the remote and local directories may happen under the authorization of a remote directory IT administrative person. When passing the information to the remote destination, as described above, an enterprise IT administrative person performing or monitoring the installation process, described herein, identifies him/herself against the remote or cloud-based directory services system using an administrative person or device of the remote or cloud-based directory to ensure the link between the local and remote directories is trustworthy.

At operation 340, after the initial installation of the joining computer device 102, periodic maintenance may be performed to renew the computer object installation data from time-to-time as needed and for passing renewed information to the cloud-based directory services system 106, as described above. For example, encrypted keys for one or more installation data items expire, if the joined computer device 102 is moved to a different network address, if components or peripheral devices associated with the joined computer are changed, and the like, updated computer object information may be generated and passed to the cloud-based directory services system 106 for continued access to cloud-based resources from the joined computer. The method 300 ends at operation 395.

According to aspects of the disclosure, the above described registration of the remote or cloud-based authentication endpoint may be performed for multiple different local networks or domains 101. That is, one authentication endpoint may register with multiple local directory services systems 103 at the same time. According to this aspect the remote or cloud-based directory services system is a multi-tenant system, and the authentication endpoint can handle multiple authentication requests coming from clients belonging to different networks of different enterprises. According to an example aspect, the remote or cloud-based directory services system and the associated authentication endpoint may be enabled to perform service ticket validation with tenant isolation on a single remote or cloud computing resource. That is, validation may be performed on a single resource without utilizing a dedicated device or dedicated virtual machine (VM) in the remote or cloud-based directory per tenant.

Figure 4:
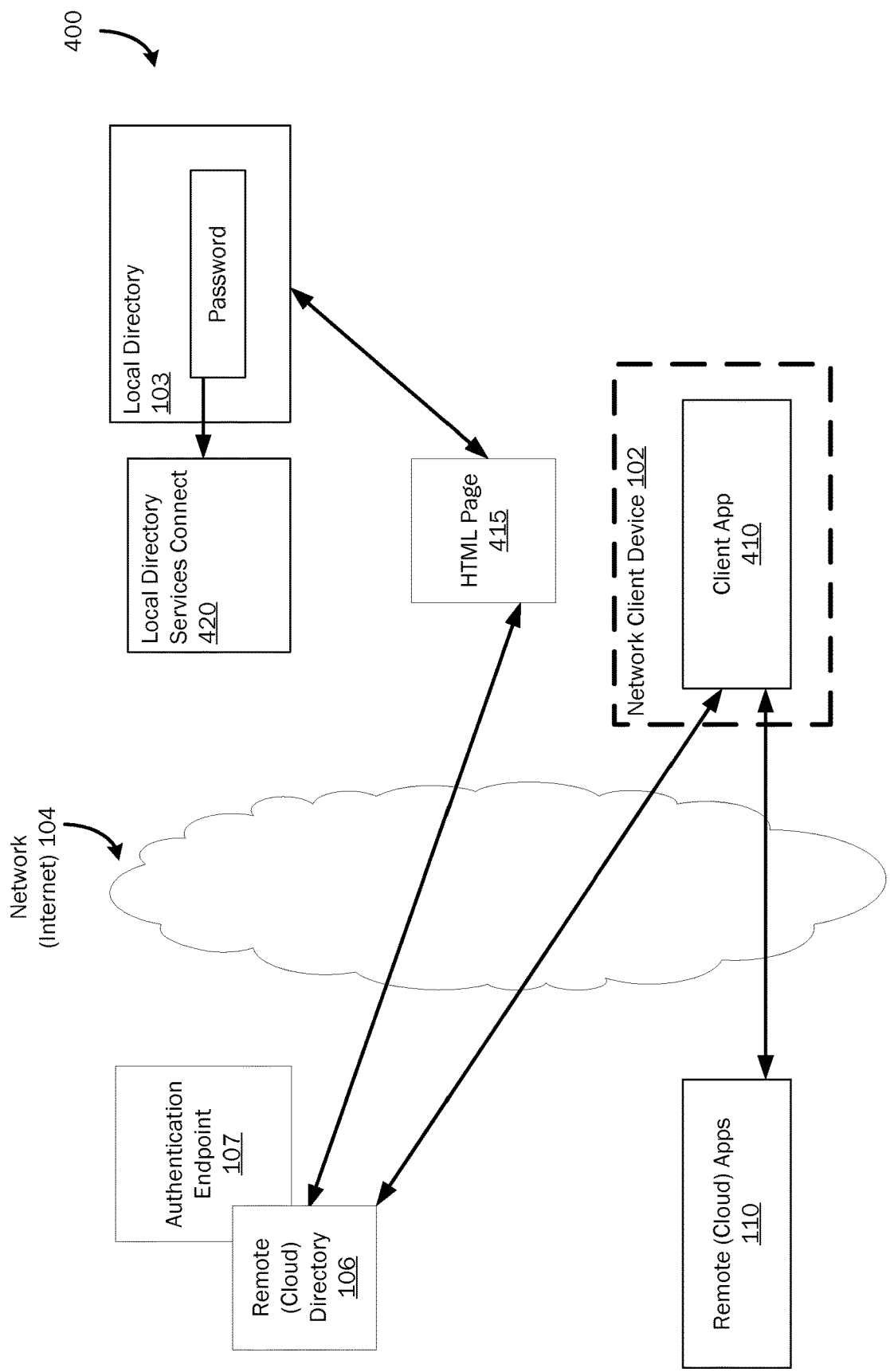
FIG. 4 is a simplified block diagram of a system for runtime authentication of a local client device, application or service against a remote or cloud-based authentication endpoint.

FIG. 4 is a simplified block diagram of one example system 400 for runtime authentication of a local client device, application or service against a remote or cloud-based authentication endpoint for allowing the local client device, application or service to access remote or cloud-based resources via an on-premises single sign-on. After the remote or cloud-based authentication endpoint has been registered with the local directory services system 103, as illustrated and described above with reference to FIGS. 2 and 3, the added computer device 102 may engage in runtime operations, including use for access to cloud-based resources 108, 110, as described above with reference to FIG. 1. The system illustrated and described with reference to FIG. 4 is only one example of a system for runtime authentication of a local client device. For example, other system structures and layouts may be utilized for other types of requesting client applications (e.g., native applications and other non-browser client applications) that may leverage the trust relationship between the local and remote directories for authenticating access to remote resources by a local client application via a local device.

Referring then to FIG. 4, a client application 410 is illustrated in association with a client device 102 with which a user may access cloud-based devices, applications 110 and services 108. According to one example, the client application 410 may include an Internet browser application for allowing a user to access Internet-based applications 110 and services 108 via a browsing operation directed to a desired cloud-based application or service. As should be appreciated, the client application 410 may include other types of applications including productivity applications, electronic mail applications, calendaring applications, notes taking applications, and the like, that are operable to access cloud-based applications and services after authentication against the remote or cloud-based authentication endpoint. For example, the client application 410 may include an electronic mail or messaging application operable for accessing a web-based system through which an electronic mail/communications system is operated.

The HTML page 415 is illustrative of a page utilized by the local directory services system 103 for automatically passing an authentication service ticket to the cloud-based directory services system 106 and associated authentication services system for authenticating access by a given device 102 to requested remote or cloud-based resources. Automatically posting an authentication service ticket to the cloud-based authentication services endpoint 107 via the HTML page 415 avoids prompting a user for authentication credentials associated with a second sign-on. According to aspects, communication of information to and from the local directory services system 103 and the cloud-based directory services system 106 may be performed according to any suitable communication protocol, including by posting the authentication information to a Java feed in association with a Java script. According to alternative aspects, for non-browsing applications, an HTML page 415 may not be utilized, but the requesting application may implement some other communication method to automatically authenticate against the remote or cloud-based directory by leveraging the trust relationship between the local and remote directories for requesting the local directory for a service ticket on behalf of the logged-on user.

The directory services connect system 420 is illustrative of a software application, module, device, or other component operative to correspond user and device authentication information for the local client application and device 410, 102 to the cloud-based authentication endpoint 107 for allowing authentication against the endpoint 107 and device and user access to cloud-based resources, as described herein. The remote or cloud-based directory services system 106 and the remote or cloud-based authentication endpoint 107 are described above with reference to FIG. 2.

Figure 5:
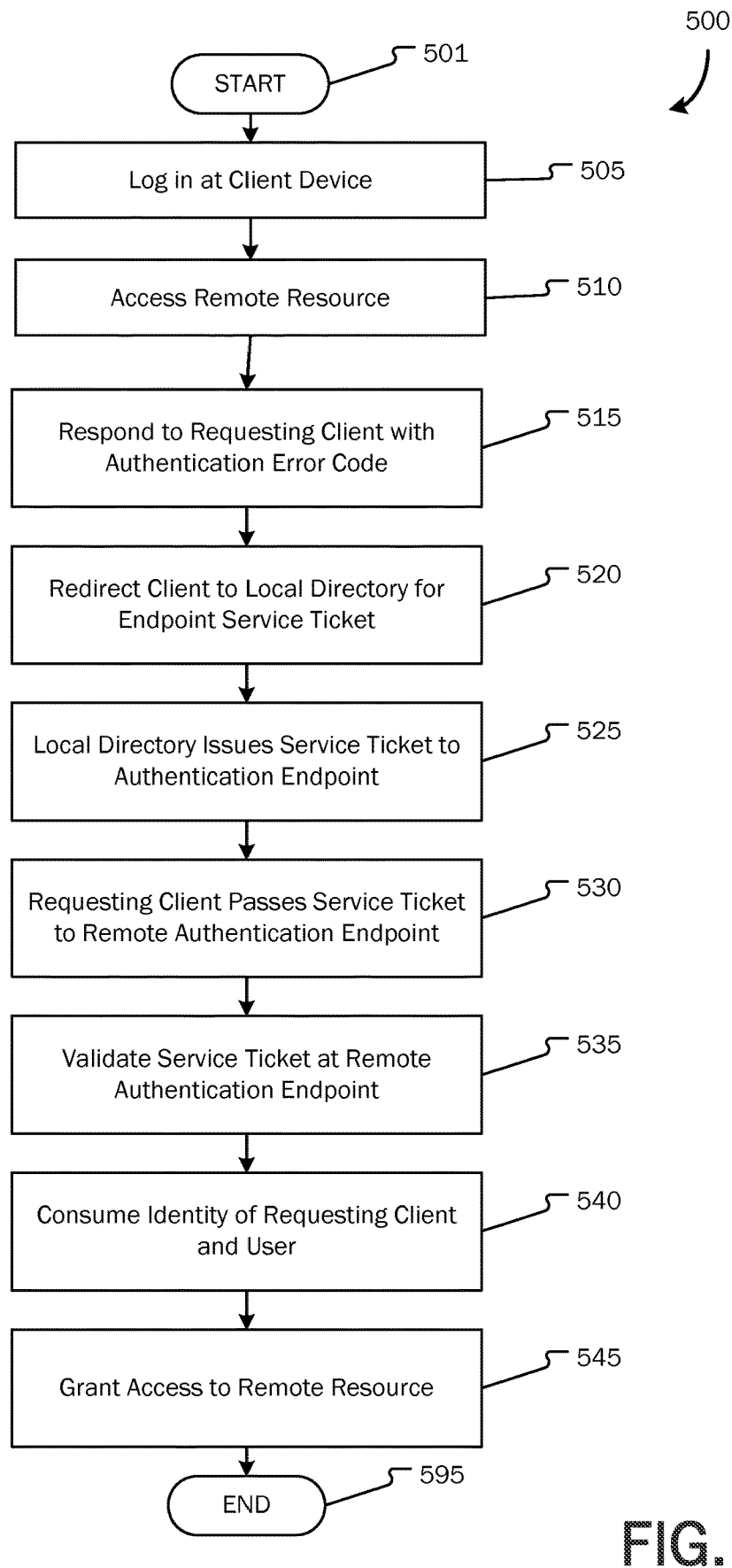
FIG. 5 is a flowchart showing general stages involved in an example method for runtime authentication of a local client device, application or service against a remote or cloud-based authentication endpoint.

FIG. 5 is a flowchart showing general stages involved in an example method 500 for runtime authentication of a local client device, application or service against a remote or cloud-based authentication endpoint for allowing the local client device, application or service to access remote or cloud-based resources via an on-premises single sign-on. For purposes of description of FIG. 5, consider for example that a user desires to access a cloud-based application 110, for example, a cloud-based word processing application from her local computer device 102 for preparing and/or editing or reviewing a document.

The method 500 begins at start operation 501 and proceeds to operation 505 where the requesting user logs in at the local computer device 102 for accessing the cloud-based application. For example, the log-in at the device 102 may include entry of a username and password or other authentication information as a part of the user's normal daily or periodic login to her enterprise computer. According to aspects, the user's log-in credentials (e.g., username and password) are passed to the local directory services system 103. As understood by those skilled in the art, the user's access to her local network is thus authenticated (i.e., the user is who she says she is) and the user is then authorized access to network resources (i.e., the user has access privileges). At operation 510, after log-in to her local network, the user desiring access to the cloud-based application 110 may launch an application, for example, the Internet browser application 410 with which the user may attempt to access the desired cloud-based application 110.

At operation 515, the requesting application, for example, the client browser application 410, contacts the cloud-based directory services system 106 for access to the requested remote or cloud-based resource. In response to the request, the remote or cloud-based directory services system 106 returns an authentication error to the requesting application, for example, a 401 status code with a www-authenticate header for causing the requesting client application to request a service ticket with which it may be authenticated against the remote or cloud-based authentication endpoint 107.

At operation 520, in response to the error code received from the cloud-based directory services system 106 (and the associated endpoint 107), the requesting application 410 makes a request to the local directory services system 103 for obtaining a service ticket that may be used by the requesting application 410 for authenticating against the remote or cloud-based endpoint 107 for obtaining authentication of the requesting user and associated device and application 102, 410 for access to the requested cloud-based application 110. That is, the requesting application 410 tries to access the authentication endpoint 107 and gets the 401 error code with a www-authenticate header. The application is aware that it is running on a requesting device 102 with a user log-on session, and therefore, the requesting application makes a request to the local directory (on its own) in order to receive a service ticket so it may reissue the request to the authentication endpoint 107 with the received service ticket. According to an alternative aspect, one or more service tickets may have been previously generated and cached, and the client application 410 may request the service ticket from cache instead of from the local directory services system 103.

At operation 525, the directory services connect system 420 generates the endpoint service ticket required for authenticating the requesting device/application against the cloud-based authentication service endpoint 107. As described above with reference to FIGS. 2 and 3, when the requesting device 102 is initially installed, the authentication endpoint 107 is designated and marked as a local device, service or resource within the local enterprise network 101. In addition, as described above, a unique identifier (e.g., SPN) for the authentication endpoint is provided for identifying the authentication services endpoint 107 as a component with which the requesting local device may communicate just as the local device would communicate with any other device or service operated internal to the local enterprise network 101.

Thus, the local directory services system 103 in association with the directory services connect system 420 generates an endpoint service ticket for allowing the requesting application and device to connect with the authentication endpoint 107 in the same manner as it would generate a service ticket for allowing the requesting device to connect with any other device or service internal to the local enterprise network 101. The generated service ticket may be passed automatically to the authentication endpoint 107 as a web-based HTML page 415. According to aspects, the service ticket is passed as a header in a HTTP request. The generation of this request by the browser application 410 occurs due to Java Script code embedded in the HTML page 415, but could also be performed as part of a different protocol, for example, for reach client applications.

At operation 530, the requesting application 410 resends the original request to the authentication services endpoint 107 with a HTTP header that includes the issued endpoint service ticket. At operation 535, the authentication services endpoint 107 validates the received endpoint service ticket for determining that the requested access may be authenticated to allow access to the requested cloud-based resource via the requesting application 410. According to one aspect, the validation of the received endpoint service ticket is performed using the installation data 220 passed to the authentication endpoint during installation of the requesting device, as illustrated and described with reference to FIGS. 2 and 3. At operation 540, the authentication endpoint 107 consumes the installation data 220 for authorizing the user for the requested resource against the remote or cloud-based directory services system 106. That is, at operation 540, user identity information is extracted from the service ticket and is then utilized for look-up in the remote or cloud-based directory for additional information about the requesting user. As should be appreciated, in some cases the received service ticket may include identity information sufficient for the authentication process and additional information look-up is not necessary.

At operation 545, the user via the requesting device is granted access to the requested resource. Thus, the user requests and receives access to a desired cloud-based resource with a single sign-on without the need for additional local equipment, for example, a federation server for separately authenticating the user's desired access to the cloud-based resources without the need for communication to the local directory services system during runtime. The method 500 ends at operation 595.

Where a number of different local networks, for example, a number of different local enterprise networks 101 associated with different companies, schools, or other enterprises, utilize the services of the cloud-based directory services system 106 and the associated authentication endpoint 107 for access to one or more remote or cloud-based devices, applications or services, it may be desirable to discover the tenant identity associated with a requesting user/application/device. According to one aspect, tenant identity information may be retrieved when the user enters her username for identifying the tenant in the cloud-based directory services system 106 in association with a particular local directory services system. Advantageously, authentication for multiple tenants requesting access to cloud-based resources may be provided by a single cloud-based directory services system 106 and associated authentication endpoint 107.

Implementations have been described in the general context of computing device and system components and program modules that execute in conjunction with an application program that runs on an operating system on a computer. Those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
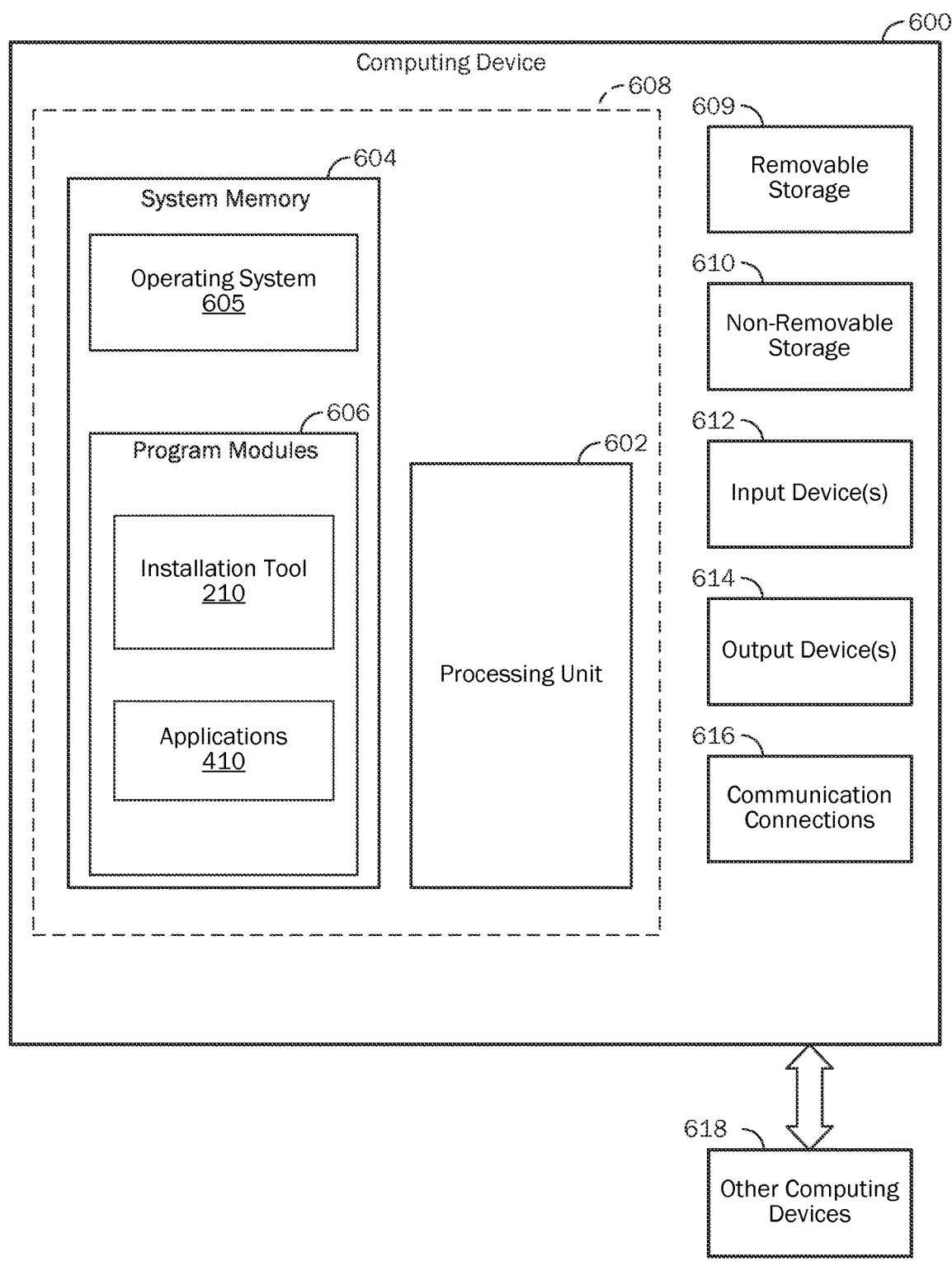
FIG. 6 is a block diagram illustrating example physical components of a computing device.
Figure 7A:
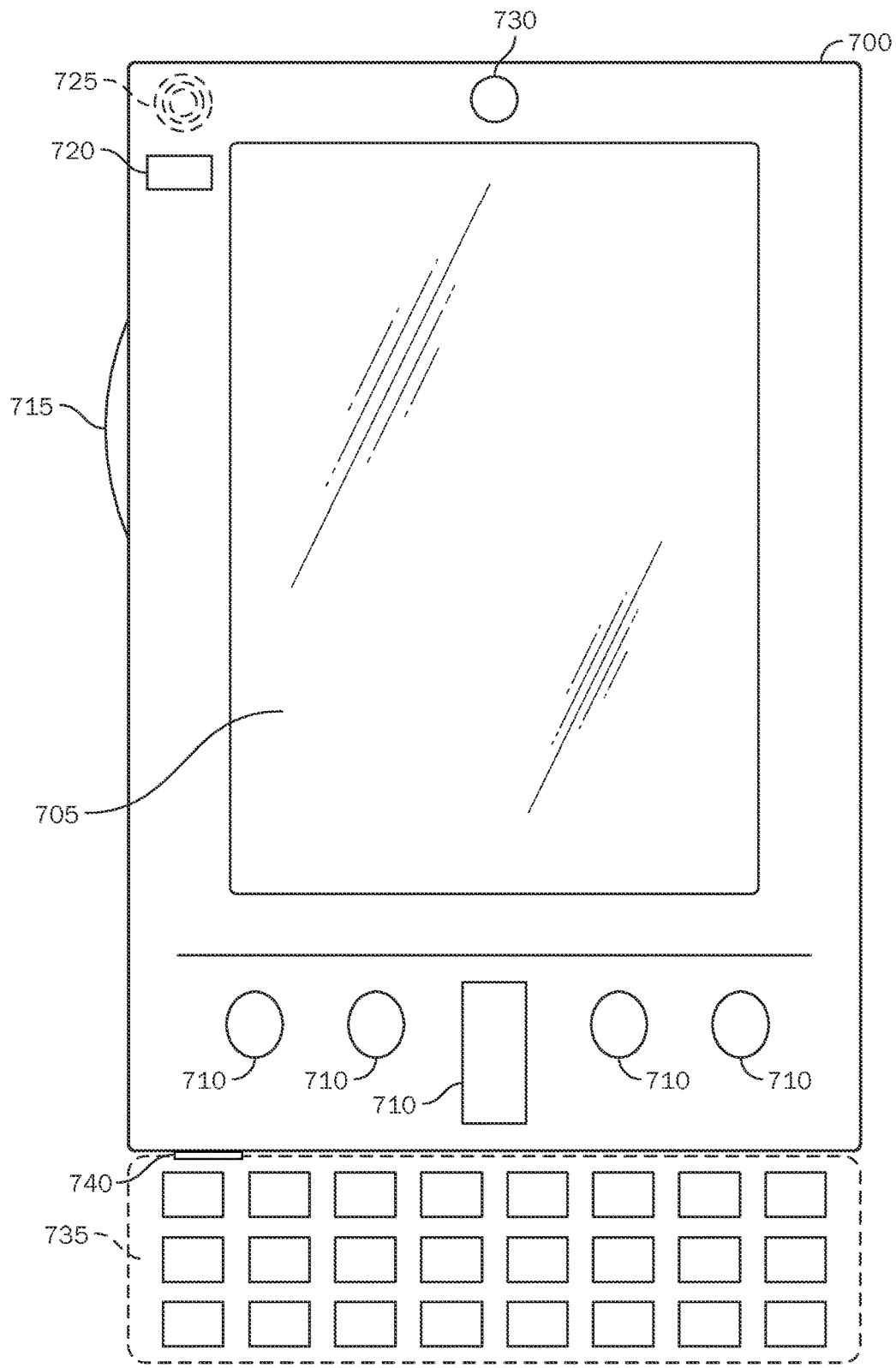
FIGS. 7A and 7B are simplified block diagrams of a mobile computing device.
Figure 7B:
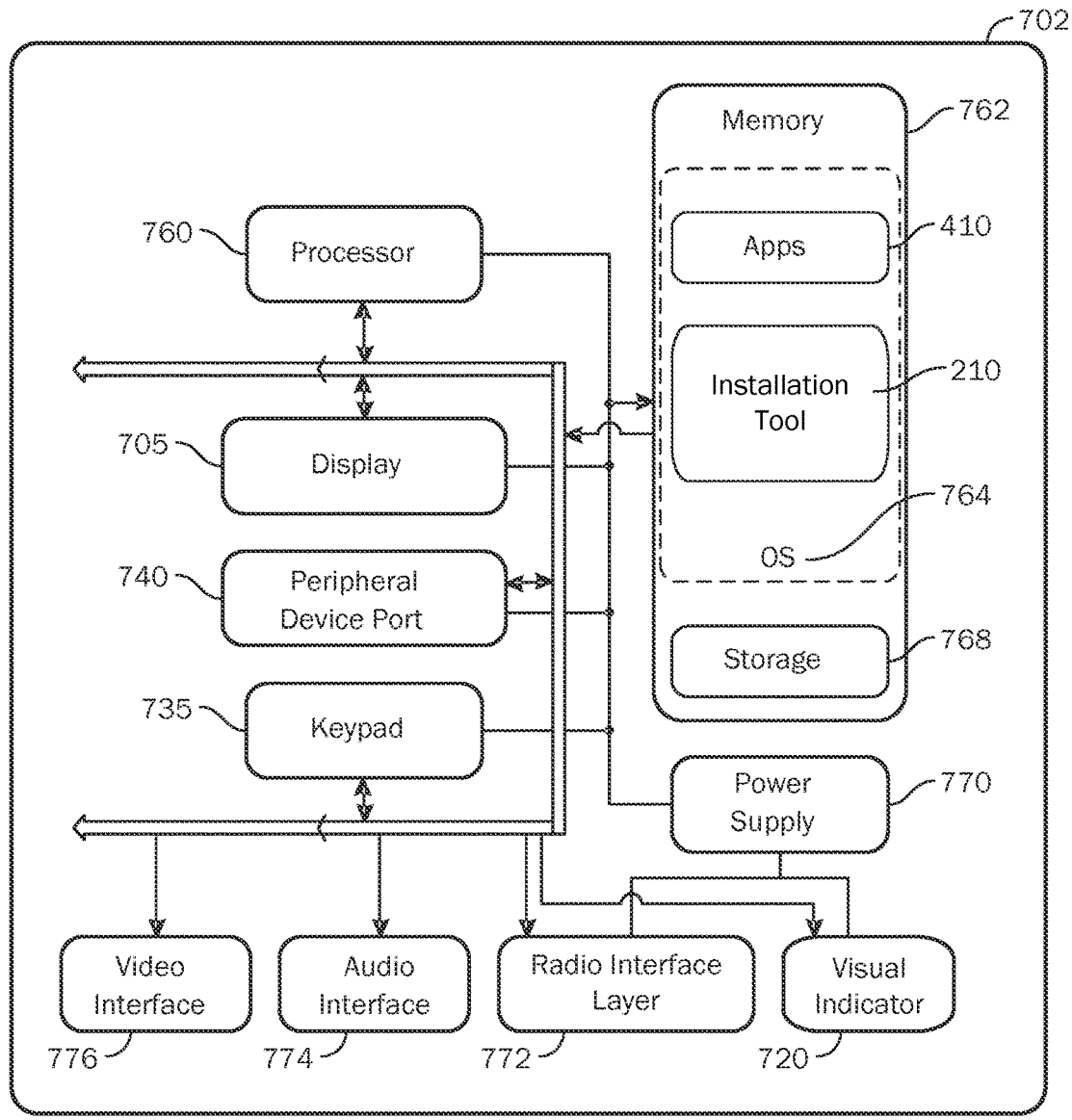

FIGS. 6, 7A and 7B and the associated descriptions provide a discussion of a variety of operating environments in which examples are practiced. However, the devices and systems illustrated and discussed with respect to FIGS. 6, 7A and 7B are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure are be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more programming modules 606 suitable for running software applications 410. According to an aspect, the system memory 604 includes the installation tool 210. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., installation tool 210) perform processes including, but not limited to, one or more of the stages of the methods 300 and 500 illustrated in FIGS. 3 and 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples.

In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 410 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the installation tool 210 is loaded into memory 762. The system 702 also includes a non-volatile storage area 768 within the memory 762. The non-volatile storage area 768 is used to store persistent information that should not be lost if the system 702 is powered down. The application programs 410 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 410 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing single sign-on to remote or cloud-based computing resources, comprising:

registering a cloud-based authentication endpoint of a cloud-based directory services system with a local directory services system as an intranet addressed system for allowing access to the cloud-based authentication endpoint from a local network computer requesting access to a cloud-based resource;

requesting, via the local network computer, access to the cloud-based resource;

passing a request from the local network computer to the local directory services system for a service ticket corresponding to an identity for a user on the local directory services system, the service ticket being utilized by the cloud-based directory services system to grant access to the cloud-based resource;

passing the service ticket corresponding to the identity for the user on the local directory services system from the local network computer to the cloud-based authentication endpoint to validate the user associated with the local network computer;

receiving, from the cloud-based directory services system, an indication that the service ticket has been validated by the cloud-based authentication endpoint, wherein the validation of the service ticket is based on user identity information extracted from the service ticket; and in response to receiving the indication that the service ticket has been validated by the cloud-based authentication endpoint, receiving at the requesting local network computer, authorization to access the requested cloud-based resource.

2. The computer-implemented method of claim 1, wherein receiving an indication that the service ticket has been validated further comprises receiving identification information and authorization information for the user for receiving authorization to access the requested cloud-based resource.

3. The computer-implemented method of claim 1, prior to passing the request from the local network computer to the local directory services system for the service ticket associated with the cloud-based directory services system, receiving an authentication error from the cloud-based directory services system.

4. The computer-implemented method of claim 1, prior to requesting, via a local network computer, access to the cloud-based resource, receiving a sign-on at the local network computer.

5. The computer-implemented method of claim 1, wherein registering the cloud-based authentication endpoint with the local directory services causes the cloud-based authentication endpoint to be designated as a local device, service or resource accessible by the requesting local network computer via the local network.

6. The computer-implemented method of claim 1, wherein requesting access to the cloud-based resource comprises passing the request to the cloud-based directory services system.

7. The computer-implemented method of claim 1, wherein passing the service ticket to the cloud-based authentication endpoint comprises sending an HTTP header including the service ticket.

8. The computer-implemented method of claim 1, wherein registering the cloud-based authentication endpoint comprises creating a computer identification object for the cloud-based authentication endpoint in the local directory services system.

9. The computer-implemented method of claim 8, wherein creating the computer identification object for the cloud-based authentication endpoint in the local directory services system includes:
   creating the computer identification object in the local directory services system wherein the computer identification object represents the cloud-based authentication endpoint;
   linking the computer identification object to the cloud-based authentication endpoint via a password or other secret data item; and
   utilizing the linking for creating the service ticket that is passed to the cloud-based authentication endpoint for validation of the service ticket by the cloud-based endpoint for authenticating access by the user via the local network computer to the requested cloud-based resource in response to a single sign-on attempt to the requested cloud-based resource.

10. The computer-implemented method of claim 1, wherein registering the cloud-based authentication endpoint enables the service ticket to be passed to the cloud-based authentication endpoint as a local endpoint.

11. The computer-implemented method of claim 10, further comprising creating a unique identifier for the cloud-based authentication endpoint, the unique identifier linking the local directory services system and an associated local device, service or resource with the cloud-based authentication endpoint.

12. The computer-implemented method of claim 11, wherein creating a unique identifier for associating the cloud-based authentication endpoint with the local directory services system includes creating a service principal name (SPN) for the cloud-based authentication endpoint.

13. The computer-implemented method of claim 10, wherein registering the cloud-based authentication endpoint with the local directory services system as a local device, service or resource includes registering the cloud-based authentication endpoint with a plurality of local directory services systems as a local device, service or resource in each of the plurality of local directory services systems for allowing a service ticket to be passed from each of the plurality of local directory services systems to the cloud-based authentication endpoint for authenticating a local network computer associated with each of a plurality of local directory network services systems against the cloud-based authentication endpoint.

14. The computer-implemented method of claim 13, wherein each of the plurality of local directory services systems is associated with a different computing tenant.

15. The computer-implemented method of claim 1, further comprising:
   receiving at the cloud-based authentication endpoint an initial request from the local network computer for access to the cloud-based resource;
   returning an authentication error code indicating the initial request cannot be authenticated;
   in response to the authentication error code, receiving at the cloud-based authentication endpoint the service ticket from the local directory services system corresponding to the identity for the user on the local directory services system utilizing the local network computer; and
   at the cloud-based authentication endpoint, validating the received service ticket and authenticating the user associated with the requesting local network computer for access to the cloud-based resource.

16. A computer-implemented method for providing single sign-on to remote or cloud-based computing resources, comprising:
   registering a cloud-based authentication endpoint of a cloud-based directory services system with a local directory services system as an intranet addressed system for allowing access to the cloud-based authentication endpoint from a local network computer requesting access to a cloud-based resource;
   in response to a request from the local network computer at the local directory services system for a service ticket corresponding to an identity for a user on the local directory services system, receiving, from the local network computer, at the cloud-based authentication endpoint, the service ticket corresponding to the identity for the user on the local directory services system to validate the user associated with the requesting local network computer;
   validating, using the cloud-based authentication endpoint, the user associated with the requesting local network computer, wherein the validating is based on user identity information associated with the service ticket;
   providing by the cloud-based directory services system, an indication that the service ticket has been validated; and
   in response to receiving the indication that the service ticket has been validated, providing to the requesting local network computer, authorization to access the requested cloud-based resource.

17. The computer-implemented method of claim 16, wherein validating the user includes generating authorization information for the user for providing authorization to access the requested cloud-based resource.

18. The computer-implemented method of claim 16, wherein registering the cloud-based authentication endpoint includes linking the cloud-based authentication endpoint with the local directory services system for allowing the cloud-based authentication endpoint to receive the service ticket from the local directory services system associated with the intranet device.

19. The computer-implemented method of claim 16, wherein registering the cloud-based authentication endpoint comprises registering the cloud-based authentication endpoint with a plurality of local directory services systems as a local device, service or resource for allowing one or more service tickets to be passed from each of the plurality of local directory services systems to the cloud-based authentication endpoint for authenticating a local network computer associated with each of a plurality of local directory network services systems against the cloud-based authentication endpoint.

20. A system comprising:

at least one processor; and memory coupled to the at least one processor, the memory comprising computer executable instructions that, when executed by the at least one processor, performs a method comprising:

registering a cloud-based authentication endpoint of a cloud-based directory services system with a local directory services system as an intranet addressed system for allowing access to the cloud-based authentication endpoint from a local network computer requesting access to the cloud-based resource;

requesting, via the local network computer, access to the cloud-based resource;

passing a request from the local network computer to the local directory services system for a service ticket corresponding to an identity for a user on the local directory services system, the service ticket being utilized by the cloud-based directory services system to grant access to the cloud-based resource;

passing the service ticket corresponding to the identity for the user on the local directory services system from the local network computer to the cloud-based authentication endpoint for validating the user associated with the local network computer;

receiving, from the cloud-based authentication endpoint, an indication that the service ticket has been validated by the cloud-based directory services system, wherein the validation of the service ticket is based on user identity information extracted from the service ticket; and in response to receiving the indication that the service ticket has been validated by the cloud-based authentication endpoint, receiving at the requesting local network computer, authorization to access the requested cloud-based resource.

\* \* \* \* \*